United States Patent [19]

Merkenich et al.

[11] Patent Number: 5,234,707
[45] Date of Patent: Aug. 10, 1993

[54] PROCESSED CHEESE PREPARATIONS AND METHOD OF MAKING

[75] Inventors: Karl Merkenich, Fuerth/Fahrenbach; Andrea Maurer-Rothmann, Weinheim; Edgar Walter, Mannheim; Guenter Scheurer, Hasloch; Henning Klostermeyer, Freising, all of Fed. Rep. of Germany

[73] Assignee: BK Ladenburg GmbH Gesellschaft fuer chemische Erzeugnisse, Ladenburg, Fed. Rep. of Germany

[21] Appl. No.: 802,637

[22] Filed: Dec. 9, 1991

[30] Foreign Application Priority Data

Dec. 19, 1990 [DE] Fed. Rep. of Germany ....... 4040621

[51] Int. Cl.5 .......................................... A23C 19/082
[52] U.S. Cl. .................................. 426/582; 426/583; 426/577; 426/578
[58] Field of Search ............... 426/582, 583, 661, 577, 426/601, 604, 578

[56] References Cited

U.S. PATENT DOCUMENTS 4,568,555  2/1986  Spanier ............................... 426/582
5,061,503 10/1991  Kong-Chan et al. ............... 426/582

OTHER PUBLICATIONS

Kosikowski, F. 1966, Cheese and Fermented Milk Foods, Edwards Brothers, Inc. Ann Arbor, Mich., pp. 290, 297, 298, 299.
Whistler, R. et al. 1984. Starch: Chemistry and Technology, 2nd. Ed. Academic Press, N.Y. p. 579.

Primary Examiner—Jeanette Hunter
Assistant Examiner—Helen Pratt
Attorney, Agent, or Firm—Foley & Lardner

[57] ABSTRACT

The present invention provides a processed cheese preparation containing cheese, fat, processing salts, water and conventional additives, such as emulsifiers, binding agents, thickeners, curds, milk protein and aroma materials in the usual amounts, wherein trisodium citrate and/or sodium phosphate are used as processing salts in an amount of from 1.5 to 3% by weight and the mixture contains a modified starch with a high amylopectin and a low amylose content and/or highly esterified pectin, in an amount of from 0.25 to 2% by weight.

5 Claims, No Drawings

PROCESSED CHEESE PREPARATIONS AND METHOD OF MAKING

BACKGROUND OF THE INVENTION

The present invention relates to a novel processed cheese preparation, as well as to the use of special additives in the production of processed cheese.

Processed cheese preparations were first produced as long ago as 1911 and subsequently have been continuously improved in taste, appearance and texture by change of the composition of the starting materials. Depending upon the composition, spreadable or sliceable products can thereby be obtained. The starting material is a sliceable cheese, such as Gouda, Emmentaler or the like, which is comminuted and mixed together with fat, especially butter, and processing salts, as well as possibly with some water, at a temperature of from 80° to 95° C. and melted, whereafter the mass is shaped, cooled and packaged.

The addition of processing salts with their calcium-complexing and buffering action, in an amount of about 2.5 to 4% of the total weight, proves to be absolutely necessary in order to prevent a demixing of casein, fat and water. On the other hand, it has been shown that the processing salts lead to a deposition of crystals on the surface of the processed cheese in the event of comparatively long storage, especially in the event of varying temperature. The materials separated out in very fine crystals are thought by the user to be either mold or the cheeses are also regarded as being no longer edible because of the "sandy" surface. Naturally, crystallizing out takes place more quickly and extensively when the concentration of the processing salts is higher, so that, especially in the case of a processing salt content of 3 to 4% by weight, crystal formation is observed within the course of a few weeks. But, even in the case of a processing salt concentration of 1.5 to 2% by weight, which is not fully sufficient, crystallizing out cannot be prevented when trisodium citrate is used as a processing salt.

Therefore, there is a need to produce processed cheese preparations which, on the one hand, have a melting behavior which is sufficient for problem-free production and, on the other hand, does not lead to crystallizing out of the processing salts. Furthermore, the additives must not have a negative influence on the taste and sensory properties of the finished processed cheese.

SUMMARY OF THE INVENTION

It is therefore an object of the present invention to provide a processed cheese preparation which has a melting behavior which is sufficient for problem-free production and does not lead to crystallizing out of the processing salts.

In accomplishing these and other objects, there has been provided, according to the present invention, a processed cheese preparation containing cheese, fat, processing salts, water and conventional additives, such as emulsifiers, binding agents, thickeners, curds, milk protein and aroma materials in usual amounts, wherein trisodium citrate and/or sodium phosphate are used as processing salts, in an amount of from 1.5 to 3% by weight, and the mixture contains a modified starch with a high amylopectin and a low amylose content and/or highly esterified pectin in an amount of from 0.25 to 2% by weight.

Modified starches and especially starch derivatives made soluble in hot or also in cold water by partial hydrolysis and/or esterification or etherification are already known as binding agents and thickeners for numerous possibilities of use in the foodstuff industry. Typical uses are, for example, in instant soups and sauces, desserts, fruit and cream fillings, mayonnaises, ice cream, microwave products and finished dishes. It is known that, depending upon the origin of the starch from wheat, maize, potatoes, rice, tapioca or waxy maize, the content of amylose and amylopectin can vary (25:75, 20:80 and 1:99%, respectively), and thereby the thickening and gelling behavior differs. Products with a high amylose content thicken slowly in upon dissolving but nevertheless, upon cooling, form stable gels, whereas amylopectin-rich products dissolve quickly and increase the viscosity correspondingly quickly, but do not form gels, so that the products do not subsequently thicken very much. By modification of the native starches by acidic or basic hydrolysis, by esterification with acetic acid, phosphoric acid or adipic acid, or by reaction with propylene oxide to give hydroxypropylstarches, or by a combination of these processes, it is known to produce modified starches. The solubility and swellability, especially in cold water, of these modified starches is improved and, in a swollen state, they are stable during comparatively long heating. In particular, however, they have a high stability during freezing and thawing.

Surprisingly, a particular group of these modified starches acts in the processed cheese preparations of the present invention, not only as binding agents and thickeners, but also to permit the added amount of the processing salts, especially of trisodium citrate, to be approximately halved in comparison with known recipes. Therefore, crystal formation no longer occurs and efflorescence on the cheese surface does not take place.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Modified starches used according to this invention are produced from amylopectin-rich and amylose-poor starches, and especially from waxy maize starches; tapioca starch is somewhat less suitable, whereas, for example, potato starches are unsuitable. Modified starches which can be used according to the present invention must fulfill the following conditions:

1. at temperatures of 60° to 90° C., they must be soluble in water;
2. at temperatures of 60° to 90° C., they must display in water a high viscosity which is constant for at least 10 minutes;
3. they must be taste-neutral, or, in particular, they must not have a pasty taste; and
4. they must be compatible with milk protein, or, in particular, they must not have a denaturing action or give rise to lumps.

Apart from waxy maize starch and partial hydrolysis products thereof, starches that are especially suitable include hydroxypropyl waxy maize starch, hydroxypropyl distarch phosphate from waxy maize starch and tapioca, and acetylated distarch phosphate and distarch adipate from waxy maize starch. Highly esterified pectins and especially fruit and beet pectins can also be used.

For sufficient action of the modified starch additives, it is necessary to add them at about 0.25 to 2.5% by weight, and preferably 0.5 to 1% by weight of the total amount. An excess naturally does not prevent the desired effect but is not advisable for economic reasons and because the firmness of the product can become too great. The processed cheese mixture according to the present invention can, without problems, contain up to 3% by weight of processing salt, and preferably 1.5 to 2.5% by weight thereof, without crystallizing out taking place.

As processing salts, trisodium citrate or sodium phosphate or mixtures thereof can be used, usually in the form of commercially available hydrates.

As binding agents and thickeners, one can use the usual amounts, i.e., 0 to 3% by weight and preferably 0.5 to 1% by weight of the total mass of starch, modified starches of sources other than those modified starches listed above, such as guar flour, carob bean flour, carragheen, methyl- and carboxymethylcellulose, agar-agar, alginates and similar products.

Butter is preferred as the source of fat. However, it is also possible to use other animal or vegetable fats and oils, such as are employed in the margarine industry, or also cream.

As cheese replacement materials, one can also use casein, whey powder, curds, yoghurt, milk protein and, to a certain extent, also vegetable proteins and especially soya proteins.

In order to change the flavor, one can also add flavoring salts and herbs, and optionally particulate products, for example meat products, fruits, nuts, fungi and the like.

According to present practice, in some cases the processed cheese mass is brought into a foamed and creamy state by passing gases, especially nitrogen, through the mixture. Such embodiments are also possible with preparations according to the present invention.

The present invention is further described below with regard to the following illustrative examples.

EXAMPLE 1

Spreadable Processed Cheese

Ingredients
71.7 kg Gouda (45% fat in the dry weight)
1.8 kg trisodium citrate
1.4 waxy maize starch
5.2 kg butter
19.9 kg water The above products are mixed together in a stirrer vessel and heated, while slowly stirring, to the melting temperature of about 90°-92° C., in about 10 to 20 minutes by passing steam through. Thereafter, the mixture is homogenized with vigorous stirring, the mass is poured into molds, cooled to ambient temperature, and temporarily stored for 12 hours. Final storage until use takes place at 6° C.

A spreadable processed cheese is obtained which contains 46% of fat in the dry weight, in the case of a total dry weight of 46%. Even after storage for 4 to 6 months, the appearance and consistency do not change and, in particular, no efflorescence of the processing salts is observed.

EXAMPLE 2

Sliceable Processed Cheese

Ingredients
74.9 kg Gouda (45% fat in the dry weight)
1.5 kg trisodium citrate
0.4 kg modified starch (hydroxypropyl distarch phosphate from waxy maize starch, purity W)
1.0 kg saccharose monostearoyl monocitric acid ester
4.2 kg butter
18.0 kg water The mixture is worked up as in Example 1, except that it is heated to 95° C.

A sliceable cheese is obtained with a fat content of 47% in the dry weight and with a dry weight of about 50%. In this preparation, also, no efflorescence of processing salts is observed after storage for 6 months.

EXAMPLE 3

Sliceable Processed Cheese

Ingredients
73.2 kg Edam (46% in the dry weight)
1.5 kg trisodium citrate
2.0 kg acetylated distarch phosphate from waxy maize starch (Ultra Tex 2)
4.8 kg butter
18.5 kg water The mixture is worked up as described in Example 1. A sliceable processed cheese is obtained, with a fat content of 46% fat in the dry weight, which can be stored without change for 6 months.

EXAMPLE 4

Sliceable Processed Cheese

Ingredients
75.0 kg Gouda (45% fat in the dry weight)
2.0 kg trisodium citrate:disodium phosphate (50:50)
0.5 kg apple pectin
4.3 kg butter
18.2 kg water The mixture is worked up in the manner described in Example 1.

A sliceable processed cheese is obtained, with a fat content of 46% fat in the dry weight, which can be stored without change for 6 months.

What is claimed is:

1. A processed cheese preparation comprising cheese, fat, water, an additive component and a processing salt component selected from at least one of trisodium citrate and sodium phosphate, wherein
said processing salt component is present at a concentration of from about 1.5 to about 3% by weight,
said additive component is selected from the group consisting of
a modified starch having an amylopectin content of at least 80% and an amylose content of at most 20%,
a fruit pectin,
a beet pectin and mixtures thereof, and
said additive component is present at a concentration of from about 0.25 to about 2% by weight, whereby crystallizing out of said processing salt component and resulting efflorescence on the surface of said cheese preparation is prevented.

2. A processed cheese preparation according to claim 1, said cheese preparation further comprising any of the following: an emulsifier, a binding agent, a thickener, curds, a milk protein or an aroma providing material.

3. A processed cheese preparation according to claim 1, wherein said additive component is present at a concentration of from about 0.5 to about 1% by weight.

4. A processed cheese preparation according to claim 1, wherein said modified starch is produced from waxy maize.

5. A method of producing a processed cheese comprising the steps of mixing and heating to the melting temperature a mixture comprising cheese, fat, water, an additive component and a processing salt component selected from at least one of trisodium citrate and sodium phosphate, homogenizing the resulting melting mixture with vigorous mixture, and cooling the resulting homogenized mixture to ambient temperature, wherein said processing salt component is present at a concentration of from about 1.5 to about 3% by weight, said additive component is selected from the group consisting of a modified starch having an amylopectin content of at least 80% and an amylose content of at most 20%, a fruit pectin, a beet pectin and mixtures thereof, and said additive component is present at a concentration of from about 0.25 to about 2% by weight, whereby crystallizing out of said processing salt component and resulting efflorescence on the surface of said cheese preparation is prevented.

* * * * *